United States Patent
Wakizaka et al.

(10) Patent No.: US 9,159,992 B2
(45) Date of Patent: Oct. 13, 2015

(54) NEGATIVE ELECTRODE ACTIVE MATERIAL FOR LITHIUM ION SECONDARY BATTERY AND LITHIUM ION SECONDARY BATTERY

(75) Inventors: Yasuhiro Wakizaka, Yokohama (JP); Takumi Sugimoto, Kanagawa (JP)

(73) Assignee: Zeon Corporation, Tokyo (JP)

( * ) Notice: Subject to any disclaimer, the term of this patent is extended or adjusted under 35 U.S.C. 154(b) by 856 days.

(21) Appl. No.: 13/138,502

(22) PCT Filed: Feb. 26, 2010

(86) PCT No.: PCT/JP2010/053111
§ 371 (c)(1),
(2), (4) Date: Aug. 26, 2011

(87) PCT Pub. No.: WO2010/098452
PCT Pub. Date: Sep. 2, 2010

(65) Prior Publication Data
US 2011/0311867 A1    Dec. 22, 2011

(30) Foreign Application Priority Data

Feb. 27, 2009    (JP) ................................. 2009-046987

(51) Int. Cl.
| | | |
|---|---|---|
| H01M 4/60 | (2006.01) | |
| H01M 10/00 | (2006.01) | |
| H01M 4/64 | (2006.01) | |
| H01M 4/583 | (2010.01) | |
| C25D 5/56 | (2006.01) | |
| B05D 5/12 | (2006.01) | |
| H01M 4/137 | (2010.01) | |
| H01M 4/1399 | (2010.01) | |
| H01M 4/36 | (2006.01) | |
| H01M 4/62 | (2006.01) | |
| H01M 10/0525 | (2010.01) | |
| H01M 4/04 | (2006.01) | |
| H01M 4/02 | (2006.01) | |

(52) U.S. Cl.
CPC ............ *H01M 4/137* (2013.01); *H01M 4/1399* (2013.01); *H01M 4/366* (2013.01); *H01M 4/602* (2013.01); *H01M 4/62* (2013.01); *H01M 4/625* (2013.01); *H01M 10/0525* (2013.01); *H01M 4/0404* (2013.01); *H01M 2004/027* (2013.01); *Y02E 60/122* (2013.01)

(58) Field of Classification Search
CPC ... H01M 4/137; H01M 4/1399; H01M 4/366; H01M 4/602; H01M 4/625; H01M 4/62; H01M 4/0404; H01M 10/0525
USPC ............ 429/211, 213; 205/164; 427/122, 123
See application file for complete search history.

(56) References Cited

U.S. PATENT DOCUMENTS

2009/0011333 A1 * 1/2009 Wakita et al. .................. 429/220

FOREIGN PATENT DOCUMENTS

| EP | 2 139 009 A1 | 12/2009 | |
| EP | 2139009 A1 * | 12/2009 | .............. H01B 5/00 |
| JE | 2007-311057 A | 11/2007 | |
| JP | 2007-123100 A | 5/2007 | |
| JP | 2007123100 A * | 5/2007 | .............. H01M 4/38 |
| JP | 2007213866 A * | 8/2007 | .............. H01M 4/58 |
| JP | 2007311057 A * | 11/2007 | .............. H01M 4/62 |
| JP | 2008-282801 A | 11/2008 | |
| JP | 2009-117333 A | 5/2009 | |
| WO | WO 2008/132933 A1 | 11/2008 | |

OTHER PUBLICATIONS

International Search Report, dated Jun. 1, 2010, issued in PCT/JP2010/053111.

* cited by examiner

Primary Examiner — Karie O'Neil Apicella
(74) Attorney, Agent, or Firm — Birch, Stewart, Kolasch & Birch, LLP

(57) ABSTRACT

Disclosed is a negative electrode active material for a lithium ion secondary battery, which is capable of further improving the charge/discharge cycle characteristics. Also disclosed is a lithium ion secondary battery which uses the negative electrode active material for a lithium ion secondary battery. The negative electrode active material for a lithium ion secondary battery is composed of composite particles each of which has a core/shell structure configured of a core part that is formed from a polymer and a shell part that is formed of a metal layer. The metal layer of the shell part is formed by metal plating. Preferably, the metal layer comprises at least a metal layer (a1) that is formed by electroless plating and a metal layer (a2) that is formed by electrolytic plating, in this order from the core part side.

11 Claims, No Drawings

NEGATIVE ELECTRODE ACTIVE MATERIAL FOR LITHIUM ION SECONDARY BATTERY AND LITHIUM ION SECONDARY BATTERY

TECHNICAL FIELD

The present invention relates to a negative electrode active material for a lithium ion secondary battery, formed by coating a polymer particle with a metal layer by metal plating and has improved charge-discharge cycle characteristic, and also the present invention relates to a lithium ion battery using said negative electrode active material for the lithium ion secondary battery.

BACKGROUND ART

Recently the mobile terminals such as a laptop computer, a cell phone, PDA or so has become extremely common, and as the power supply of these mobile terminals, a lithium ion secondary battery has been used in many cases. As the demanding characteristics of the mobile terminal power supply, the high capacity may be mentioned; however currently the capacity of the battery using the graphite type negative electrode is saturated, thus it is difficult to make large increase in the capacity. Thus, the use of silicon (Si) and tin (Sn) or the alloy thereof as the negative electrode active material is being thought in order to attain larger capacity (Patent document 1).

However, when the charge and discharge is carried out in such lithium ion secondary battery, the negative electrode active material expands and contracts during the insertion and extraction release of the lithium ion and causes a crack in the negative electrode layer. If, further charge-discharge are repeated under such condition, then the negative electrode layer can not withhold the rapid expansion and contraction of the negative electrode active material and due to the cracks in the negative electrode being spread or so, the negative electrode layer may be released and slip off.

Therefore, it is demanded to improve the cycle characteristics by solving such problems. Thus, in order to improve such cycle characteristics, the Patent document 2 describes the technology to manufacture hollow particles of alloy; however, such hollow particle of alloy did not necessary allow to obtain the sufficient cycle characteristics. Also, during the press of the electrode, the corruption of the hollow particle of alloy occurred, and it was not possible to control the desired density.

Said document also describes the method of removing the core portion made of polymer by heat treating after the production of the electrode. However, there are some problems such as lowering the conductivity or so since the current collector foil is oxidized.

Also, even when said core portion is left, there were still problems such that the sufficient charge-discharge cycle can not be obtained.

PRIOR ART DOCUMENT

Patent document 1: Japanese Patent Laid Open H10-162823
Patent document 2: Japanese Patent Laid Open 2007-123100

SUMMARY OF THE INVENTION

Technical Problems to be Solved by the Invention

The present invention is achieved in view of such problems, and the object of the present invention is to provide the negative electrode active material for the lithium ion secondary battery which enables to improve the charge-discharge cycle characteristic, and the lithium ion secondary battery using said negative electrode active material for the lithium ion secondary battery.

Means for Solving the Technical Problems

By keen examination for solving said problems, in order to improve the charge-discharge cycle characteristics, it was found that the polymer particle needs to be remained as the core and the dispersibility of the composite particle during the production of the slurry needs to be improved. Further, in order to obtain the composite particles, the metal layer may be formed on the polymer particles by the metal plating. The metal layer formed by metal plating has surface of high homogeneity, hence the electrical potential at the surface is good and is superior in dispersibility. The present invention was attained based on such knowledge.

According to the present invention, the negative electrode active material for the lithium ion secondary battery comprising a composite particle formed by core/shell structure having a core portion formed by a polymer and a shell portion of a metal layer, wherein said metal layer of the shell portion is formed by metal plating.

In the present invention, the metal layer at least comprises a metal layer a1 formed by an electroless plating and a metal layer a2 formed by electrolytic plating, in this order from the core portion side. By forming said metal layer a1 by electroless plating, and said metal layer a2 by electrolytic plating, it is possible to carry out the plating in a short period of time, and also the particle production can be dome by simple method as well. Also, the metal produced by the metal plating has strong mechanical strength, thus the crack due to the expansion and the contraction accompanied by the charge-discharge becomes difficult to occur, hence as a result, the composite particle superior in charge-discharge characteristic can be obtained.

In the present invention, the glass transition temperature of the polymer is preferably −70° C. or more and 80° C. or less. When the glass transition temperature of the polymer is within this range, the strain caused by the expansion and the contraction accompanied by the charge-discharge under a low and high temperature environment can be absorbed and the charge-discharge cycle characteristic can be maintained.

In the present invention, the elasticity of the polymer at 25° C. is preferably 10 MPa or more and 1000 MPa or less. When the elasticity of the polymer at 25° C. is within this range, the desired density can be obtained because the crushing during the electrode press can be prevented, and also the strain caused by the expansion and the contraction accompanied by the charge-discharge can be absorbed.

In the present invention, the polymer preferably comprises a cationic group or an anionic group. When the polymer comprises the cationic group or the anionic group, the metal layer becomes easy to be formed on the polymer particle surface thus the particle production can be carried out in a simple method, furthermore, the adhesion between the polymer particle surface and the metal layer at the interface is improved, thus the crack caused by the expansion and the contraction accompanied with the charge-discharge is less likely to occur which allows to obtain the composite particle superior in the charge-discharge cycle characteristic.

Also, according to the present invention, a slurry composition for the lithium ion secondary battery negative electrode comprising said negative electrode active material for the lithium ion secondary battery, a binder and a dispersion medium is provided. Said slurry composition preferably further comprises graphite.

Also, according to the present invention, a negative electrode for the lithium ion secondary battery formed by pasting said slurry composition of the negative electrode for the lithium ion secondary battery to a current collector, and drying is provided.

Also, according to the present invention, a lithium ion secondary battery comprising a positive electrode, a negative electrode, and an electrolytic solution is provided, wherein said negative electrode is said negative electrode for the lithium ion secondary battery.

Effects of the Invention

The negative electrode active material of the present invention is formed by the composite particle in which a metal layer having high surface homogeneity is covered over the polymer particle by metal plating, hence the dispersibility within the slurry composition for the negative electrode is superior. Also, the adhesiveness at the interface between the polymer particle as a core and the metal layer as a shell, which constitute the negative electrode active material in the present invention, is high, thus the crack caused by the expansion and the contraction accompanied by the charge-discharge is less likely to occur, thus the lithium ion secondary battery superior in charge-discharge cycle characteristic can be obtained. The negative electrode active material of the present invention can be suitably applied to the negative electrode active material of the compact secondary battery for the electronics or the negative electrode active material of the secondary battery for the motive power such as for the automobile.

BEST MODE FOR CARRYING OUT THE INVENTION

Hereinafter, the present invention will be described.

The negative electrode active material for the lithium ion secondary battery according to the present invention is formed from a composite particles having a core/shell structure comprised of a core portion formed by a polymer and a shell portion of a metal layer. The polymer constituting the core portion is preferably a polymer particle.

(The Polymer Particle)

As the polymer constituting the polymer particle used in the present invention, diene type polymer, acrylic type polymer, fluoride type polymer, urethane type polymer, silicone type polymer or so may be mentioned. Among these, diene type polymer and acrylic type polymer are preferable since it is electrochemically stable.

Diene type polymer is a homopolymer or copolymer comprising 50 mol % or more of a repeating unit formed by polymerizing the conjugated diene such as butadiene, isoprene, 1,3-pentadiene or so and the mixture thereof in the polymer.

As the specific examples of diene type polymer, polybutadiene, polyisoprene, styrene/butadiene random copolymer, styrene/isoprene random copolymer, acrlyonitrile/butadiene copolymer, styrene/acrylonitrile/butadiene copolymer, styrene/butadiene block copolymer, styrene/butadiene/styrene block copolymer, styrene/isoprene block copolymer and styrene/isoprene/styrene block copolymer or so may be mentioned.

The acrylic type polymer is a homopolymer or a copolymer comprising 50 mol % or more of the repeating unit formed by polymerizing a derivative of acrylic acid, methacrylic acid or crotonic acid and the mixture thereof in the polymer.

As the derivative of the acrylic acid, acrylic acid, methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ehtylhexyl acrylate, hydroxypropyl acrylate, lauryl acrylate, acrylonitrile, and polyethylene glycol diacrylate or so may be mentioned. As the derivative of methacrylic acid, methacrylic acid, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate, lauryl methacrylate, methacrylonitrile, glycidyl methacrylate, and tetraethylene glycol dimethacrylate or so may be mentioned. As the derivative of the crotonic acid, crotonic acid, methyl crotonate, ethyl crotonate, propyl crotonate, butyl crotonate, isobutyl crotonate, n-amyl crotonate, isoamyl crotonate, n-hexyl crotonate, 2-ethylhexyl crotonate, and hydroxypropyl crotonate or so may be mentioned. As specific examples of the acrylic type polymer, 2-ethylhexylacrylate/methacrylonitrile/ethyleneglycoldimethacrylate copolymer, 2-ethylhexylacrylate/methacrylonitrile/tetraethylene glycol dimethacrylate copolymer, 2-ethylhexylacrylate/methacrylonitrile/methoxypolyethyleneglycol/ethyleneglycoldimethaclyrate copolymer, butyl acrylate/acrylonitrile/diethylene glycol dimethacrylate copolymer, 2-ethylhexylmethacrylate/ethyl acrylate/acrylonitrile/polyethylene glycol diacrylate copolymer or so may be mentioned.

Fluoride type polymer is a homopolymer or a copolymer comprising the repeating unit formed by polymerizing the monomer containing the fluoride.

Urethane type polymer is a homopolymer or a copolymer comprising the urethane bond formed by the condensation of isocyanate group and the alcohol group.

Silicone type polymer is a homopolymer or a copolymer comprising the main backbone formed by siloxane bond.

In the present invention, the polymer constituting the polymer particle preferably comprises the anionic group or cationic group. When the polymer constituting the polymer particle comprises the anionic group or the cationic group, the adhesion between polymer particle and the metal layer is further improved.

The anionic group is a group in which a substituent group has an anionic chemical functionality, and as the anionic chemical functional group, carboxylate, sulfate, sulfonate, phosphate, phosphnate, or the mixtures thereof may be mentioned.

In order to comprise the anionic group in the polymer constituting the polymer particle, an anionic group containing ethylene unsaturated monomer may be copolymerized during the production of the polymer particle. As the anionic group containing ethylene unsaturated monomer, although it is not particularly limited, ethylene unsaturated carboxylic acid monomer such as ethylene unsaturated monocarboxylic acid monomer such as acrylic acid and methacrylic acid or so; ethylene unsaturated polyvalent carboxylic acid monomer such as itaconic acid, maleic acid, fumaric acid, butenetricarboxylic acid or so; partial ester monomer of ethylene unsaturated polyvalent carboxylic acid such as monobutyl fumarate, monobutyl maleate, mono2-hydroxypropyl maleate or so; polyvalent carboxylic acid anhydride such as maleic anhydride, citraconic anhydride or so; and the monomer comprising the sulfonate group such as styrenesulfonic acid, allyloxybenzene sulfonic acid, methallyloxybenzene sulfonic acid, vinyl sulfonic acid, allylsulfonic acid, methallyl sulfonic acid, 4-sulfonic acid butyl methacrylate or so; may be mentioned. These monomer may be used alone or by combining two or more thereof.

The cationic group is a group in which the substituent group has cationic chemical functionality, and the substituent group has formula $R_1R_2R_3R_4N^+(A^-)$. $R_1$ is as described in below.

$R_1$ is formula $-CH_2-CHOH-CH_2-$, or $-CH_2-CH_2-$, and $R_2, R_3, R_4$ are independent and are selected from alkyl group or arylalkyl group comprising 1 to 20 carbon atoms. A is halide ion, sulfate ion, phosphate ion or tetrafluoro borate ion.

In order to comprise the cationic group in the polymer constituting the polymer particle, the cationic group containing ethylene unsaturated monomer may be copolymerized during the production of the polymer particle, and if necessary, neutralizing treatment or quaternizing treatment may be carried out. As the cationic group containing ethylene unsaturated monomer, (meth)acrylate or (meth)acrylamide comprising dialkylamino groups such as, dimethylaminoethyl(meth)acrylate, diethylaminoethyl(meth)acrylate, dipropylaminoethyl(meth)acrylate, diisopropyl amino ethyl (meth)acrylate, dibutylaminoethyl(meth)acrylate, diisobutylaminoethyl(meth)acrylate, di-t-butylaminoethyl(meth)acrylate, dimethylaminopropyl(meth)acrylamide, diethylaminopropyl(meth)acrylamide, dipropylaminopropyl(meth)acrylamide, diisopropylaminopropyl(meth)acrylamide, dibutylaminopropyl(meth)acrylamide, diisobutylaminopropyl (meth)acrylamide, di-t-butylaminopropyl(meth)acrylamide or so; styrenes comprising dialkylamino group such as dimethylamino styrene, dimethlaminomethyl styrene or so; vinylpyridines such as 4-vinylpyridines, 2-vinylpyridines or so; N-vinyl heterocycle compound such as N-vinylimidazole or so; acid neutralized product or quaternary ammonium salt of the monomer comprising the amino group such as vinyl ethers such as aminoethylvinylether, dimethylaminoethylvinyl or so; diallyl quaternary ammonium salt such as dimethyldiallyl ammonium chloride, diethyldiallyl ammonium chloride or so; may be mentioned.

The content of said anionic group or cationic group in the polymer constituting the polymer particle is preferably 1 to 10 wt %, and more preferably 2 to 5 wt %, in terms of the content of the anionic group containing ethylene unsaturated monomer or the cationic group containing ethylene unsaturated monomer. When the content of the anionic group containing ethylene unsaturated monomer or the cationic group containing ethylene unsaturated monomer is within said range, the adhesion with the metal layer is good, and superior polymer particle from the aspect of the production can be obtained.

The glass transition temperature of the polymer constituting the polymer particle used in the present invention is preferably −70° C. or more and 80° C. or less, and more preferably −50° C. or above and 60° C. or less, further preferably −40° C. or above and 50° C. or less. When the glass transition temperature of the polymer constituting the polymer particle is within said range, the strain caused by the expansion and the contraction accompanied by the charge-discharge under the low and high temperature environment can be absorbed and the charge-discharge cycle characteristic can be maintained. As the method of controlling the glass transition temperature of the polymer constituting the polymer particle, the method changing the monomer ratio in the polymer, the method controlling the molecular weight, the method controlling the regularity, the method using the interaction between the contained side chains or so may be mentioned.

The glass transition temperature mentioned in here refers to the glass transition temperature of the polymer obtained by the differential scanning calorimetry.

The elasticity of the polymer constituting the polymer particle used in the present invention is preferably 10 MPa or more and 1000 MPa or less, more preferably 15 MPa or more and 800 MPa or less, and further preferably 20 MPa or more and 600 MPa or less. When the elasticity of the polymer constituting the polymer particle is within said range, the density of the electrode active material layer having the desired range can be obtained since the crushing during the electrode press can be prevented, and also the strain caused by the expansion and the contraction accompanied by the charge-discharge can be absorbed. As the method of controlling the glass transition of the temperature of the polymer constituting the polymer particle, the method changing the monomer ratio in the polymer, the method controlling the molecular weight, the method controlling the regularity, the method using the interaction between the contained side chains or so may be mentioned.

The elasticity mentioned in here refers to the elasticity of the polymer obtained by the tension tester based on JIS K6251 after the polymer particle is molded in to film shape.

The volume average particle diameter of the polymer particle is usually 0.01 µm or more and 100 µm or less, and preferably 0.1 µm or more and 50 µm or less. When the average particle diameter of the polymer particle is within said range, the dispersibility in the slurry is good. For measuring the particle diameter distribution, for example, coulter counter or micro track, or a transmission electron microscope or so may be mentioned.

The method for producing the polymer particle is not particularly limited; however any of a solution polymerization method, a suspension polymerization method, or an emulsion polymerization method may be used. As for the polymerization initiator, organic peroxides such as lauroyl peroxide, diisopropylperoxydicarbonate, di-2-ethylhexylperoxydicarbonate, t-butylperoxypivalate, 3,3,5-trimethylhexanoylperoxide; an azo compound such as α,α'-azobisisobutylonitrile or so; or ammonium persulfate, potassium persulfate or so may be mentioned.

When producing the composite particle of the present invention, the polymer particle may be dispersed in the water, or may be in beaded state, however it is preferably dispersed in the water.

The solid portion concentration when the polymer particle is dispersed in the water, it is usually 15 to 70 wt %, and preferably 20 to 65 wt % and further preferably 30 to 60 wt %. When the solid portion concentration is within said range, the performance during the composite particle production is good.

(The Metal Layer)

The material constituting the metal layer of the present invention may be any of single or alloy and compound of the metal element or the metalloid element. Also, it may at least partially have phase of one or two or more thereof. Note that, in the present invention, the alloys includes, in addition to the alloy comprised of two or more of the metal element, those having one or more of the metal elements and one or more of the metalloid elements. Also, the material constituting the metal layer may comprise non-metallic element. As the compound, oxides, nitrides, sulfides, borides of the metal element and metalloid element may be mentioned.

The negative electrode active material of the present invention comprises the core/shell structure comprised from a core portion formed from polymer, preferably polymer particle, and a shell portion of the metal layer, wherein said metal layer of shell portion is formed from metal plating. As for the metal plating, the electroless plating, the electrolytic plating, vacuum plating, hot dip plating or so may be mentioned; however the electroless plating and the electrolytic plating are preferable since it is possible to produce at low cost.

The metal layer of the shell portion used in the present invention preferably comprises a metal layer a1 formed by electroless plating, and a metal layer a2 formed by electrolytic plating, in the order from the core portion side. In the present invention, when the metal layer comprises said structure, the metal plating layer having large particle boundary and superior extension can suppress the crack during the charge-discharge cycle, and also it can suppress the crack during the slurry kneading. Thereby, the uniformity of the slurry can be made higher, and the variation of the battery capacity can be suppressed as well. Further, in order to ease and protect the expansion and contraction during the charge-discharge cycle, another additional metal layer ax may be provided over the metal layer a2. The metal layer ax may take either method of electrolytic plating or electroless plating; however in view of the adhesion, the electrolytic plating is preferable.

When forming a1 layer as the metal layer, the metal can be suitably selected from the known metals as far as the metal allows the electrolytic plating on the layer, and aluminum, chromium, manganese, iron, cobalt, nickel, copper, zinc, gallium, paradium, silver, tin, platinum, and gold or so may be mentioned. Among these, nickel, copper, tin and the alloy thereof are preferable since it is superior in cost performance and mechanical characteristics.

These metals and alloys can include a third component in order to make the formation of the metal layer a1 easier and to make the mechanical strength stronger, and as for the third component, phosphor, boron, silicon, manganese, chromium, iron or so may be mentioned.

(The Electroless Plating)

As the electroless plating, it is not particularly limited; however it is preferable to use the known electroless plating of autocatalytic type. As for the electroless plating, for example, the electroless copper plating using ammonium hypophosphite or hypophosphorous acid, ammonium boronhydride or hydrazine, or formalin as the reducing agent, the electroless nickel-phosphorous plating using sodium hypophosphite using as the reducing agent, the electroless nickel-boron plating using dimethylamine borane as the reducing agent, the electroless palladium plating, the electroless palladium-phosphorous plating using sodium hypophosphite as the reducing agent, the electroless gold plating, the electroless silver plating, the electroless nickel-cobalt-phosphorous plating using sodium hypophosphite using as the reducing agent or so may be used. The electroless copper plating and the electroless nickel-phosphorus plating are more preferable since it has advantage for forming the polymer particle and forming the electrolytic plating layer during the subsequent steps.

When carrying out the plating by the electroless plating method, the activated catalyst (plating catalyst) is provided on the polymer particle surface, then contacted with the electroless plating solution thereby the electroless plating is performed. As the catalyst, silver, palladium, zinc, cobalt or so may be mentioned, and it is generally used by activating it.

As the method for the attachment of the plating catalyst and the activation of the catalyst, it is not particularly limited, and depending on the needs, the polymer particle is contacted with the alkali solution such as potassium permanganate solution or sodium permanganate or so, then carrying out the neutralization reduction treatment by the acidic solution such as the mixture solution of the hydroxylamine sulfate and the sulfuric acid, followed by immersing in a solution dissolving metal compound of silver, palladium, zinc, cobalt, and the salt or complex compound thereof in a water or the organic solvent such as chloroform or so in a concentration of 0.001 to 10 wt % (if necessary, acid, alkali, the complexing agent, reducing agent or so may be added) thereby reducing the metal or so may be mentioned.

As the electroless plating solution used for the electroless plating, it is not particularly limited, however the electroless plating solution of the known self catalyzing type is preferably used. As the electroless plating solution, for example, the electroless copper plating using ammonium hypophosphite or hypophosphorous acid, ammonium boronhydride or hydrazine, or formalin as the reducing agent, the electroless nickel-phosphorous plating using sodium hypophosphite using as the reducing agent, the electroless nickel-boron plating using dimethylamine borane as the reducing agent, the electroless palladium plating, the electroless palladium-phosphorous plating using sodium hypophosphite using as the reducing agent, the electroless gold plating, the electroless silver plating, the electroless nickel-cobalt-phosphorous plating using sodium hypophosphite using as the reducing agent or so may be used.

(The Electrolytic Plating)

In the electrolytic plating, the plating object is electrically conducted as the negative electrode in the electrolytic solution, and the plating metal is deposited on the surface. The positive electrode of the electrolytic plating of the present invention is usually a metal element or a metalloid element capable of forming a alloy with lithium. As metal element or a metalloid element capable of forming a alloy with lithium, for example, tin, silver, zinc, platinum or alloy thereof or so may be mentioned. Among these, tin and tin alloy are preferable. As the metal forming the alloy, it is preferably two or more of metals which does not form an intermetallic compound against each other. As the tin alloy, tin-lead alloy, tin-cobalt alloy, tin-indium alloy, tin-copper alloy are preferable. By using these metal elements or the metalloid elements, the lithium ion secondary battery having a large capacity can be obtained. In order to make plating easier, to increase the mechanical strength, and to relieve the volume expansion during the insertion of lithium, these metals or metalloids may comprise the third component, and as the third component, zinc, tin, iron, nickel, silver, cobalt, silicon, or so may be mentioned. By using the electrolytic plating, the plating can be carried out in short period of time, and also the particle production can be done at low cost. Also, the metal produced by the metal plating has increased mechanical strength, and as a result, the composite particle superior in charge-discharge characteristic can be obtained.

As the negative electrode of the electrolytic plating of the present invention, the metal is used, and by contacting the polymer particle performed with the electrolytic plating, the plating can be deposited on the particle. As the metal of the negative electrode, it may be any shape, however for circulating the particle, it is preferably a mesh form or a wool form.

The thickness of the metal layer of the present invention is preferably 2 nm or more and 3 μm or less, more preferably 5 nm or more and 1 μm or less, and most preferably 50 nm or more and 500 nm or less. When the thickness of the metal layer is within this range, the lithium ion secondary battery capable of obtaining both a charge-discharge cycle characteristic and a high capacity can be obtained. The thickness of the metal layer in the electroless plating is controlled by modifying the composition of the polymer particle or the concentration of the metal catalyst solution, modifying the amount of the catalyst on the polymer particle, modifying the plating time or so. The thickness of the metal layer for the electrolytic solution is controlled by modifying the plating time, the electric quantity or so. The thickness of the metal layer is measured by observing the cross section using the transmission electron microscope.

In case of providing the metal layer a1 formed by the electroless plating and the metal layer a2 formed by electrolytic plating as the metal layer, the thickness of the metal layer a1 is preferably 2 nm or more and 3 µm or less, more preferably 5 nm or more and 1 µm or less, and most preferably 50 nm or more and 500 nm or less. The thickness of the metal layer a2 is preferably 1 nm or more and 10 µm or less, and more preferably 1 nm or more and 5 µm or less.

The slurry composition of the lithium ion secondary battery of the present invention comprises said negative electrode active material for the lithium ion secondary battery, the binder and the dispersing medium.

(The Binder)

The binder is the solution or the dispersion wherein the binder (polymer) particle having a binding property is dissolved or dispersed in the water or the organic solvent (hereinafter, it may be referred as "the binder dispersion"). When the binder dispersion is aqueous, usually it is a aqueous polymer dispersion, and for example aqueous diene polymer dispersion, aqueous acrylic polymer dispersion, aqueous fluoride polymer dispersion, aqueous silicon polymer dispersion or so may be mentioned. The aqueous diene polymer dispersion or the aqueous acrylic polymer dispersion are preferable since it is superior in the binding property with the electrode active material, and the strength or the flexibility of the obtained electrode.

Also in case the binder dispersion is non-aqueous (the organic solvent is used as the dispersing medium), usually, vinyl type polymer such as polyethylene, polypropylene, polyisobutylene, polyvinyl chloride, polyvinyliden chloride, polyvinylden fluoride, polytetrafluoroethylene, polyvinyl acetate, polyvinyl alcohol, polyvinylisobutylether, polyacrylonitrile, polymethacrylonitrile, polymethyl methacrylate, polymethyl acrylate, polyethyl methacrylate, allyl acetate, polystyrene or so; diene type polymer such as polybutadiene, polyisoprene or so; ether type polymer containing hetero atom in the main chain such as polyoxymethylene, polyoxyethylene, polycyclicthioether, polydimethylsiloxane or so; the condensed ester type polymer such as polylactone, polycyclic unhyride, polyethylene telephthalate, polycarbonate or so; N-methylpyrrolidone (NMP) dissolved with condensed amide type polymer such as nylon 6, nylon 66, poly-m-phenyl-isophthalamide, poly-p-phenylenetelephthalamide, polypyromellitimide or so may be mentioned.

The aqueous diene polymer dispersion is a aqueous dispersion including the monomer unit formed by polymerizing the conjugated diene such as butadiene, isoprene or so. The ratio of the monomer unit formed by polymerizing the conjugated diene in the diene type polymer is usually 40 wt % or more, preferably 50 wt % or more, and more preferably 60 wt % or more. As the polymer, homopolymer of the conjugated diene such as polybutadiene or polyisoprene or so; the copolymer of the conjugated diene and the copolymerizable monomer may be mentioned. As said copolymerizable monomer, α,β-unsaturated nitrile compound such as acrylonitrile, methacrylonirile or so; unsaturated carboxylic acid such as acrylic acid, methacrylic acid or so; styrene type monomer such as styrene, chlorostyrene, vinyltoluene, t-butylstyrene, vinyl benzoate, vinyl methyl benzoate, vinyl naphthalene, chloromethylstyrene, hydroxymethylstyrene, a-methylstyrene, divinylbenzene or so; olefins such as ethylene, propylene or so; diene type monomer such as butadiene, isoprene or so; halogen monomer containing monomer such as vinyl chloride, vinyliden chloride or so; vinyl ester groups such as vinyl acetate, vinyl propionate, vinyl lactate, vinyl benzoate or so; vinyl ether group such as methylvinylether, ethylvinylether, butylvinylether or so; vinyl ketones such as methylvinyl ketone, ethylvinyl ketone, butylvinyl ketone, hexylvinyl ketone, isopropenylvinyl ketone or so; heterocycle containing vinyl compound such as N-vinylpyrrolidone, vinylpyridine, vinylimidazol or so may be mentioned.

The aqueous acrylic polymer dispersion refers to the aqueous dispersion of the polymer including the monomer unit formed by polymerizing acrylic acid ester and/or methacrylic acid ester. The ratio of the monomer unit formed by polymerizing acrylic acid ester and/or methacrylic acid ester is usually, 40 wt % or more, preferably 50 wt % or more, and more preferably 60 wt % or more. As the polymer, a homopolymer of acrylic acid ester and/or methacrylic acid ester, and the copolymer of the monomer copolymerizable therewith or so may be mentioned. As said copolymerizable monomer, unsaturated carboxylic acid such as acrylic acid, methacrylic acid, itaconic acid, fumaric acid or so; carboxylic ester having two or more of the carbon-carbon double bond such as ethyleneglycoldimethacrylate, diethyleneglycoldimethacrylate, trimethylolpropanetriacrylate or so; styrene type monomer such as styrene, chlotostyrene, vinyltoluene, t-butylstyrene, vinylbenzoate, methyl vinylbenzoate, vinylnaphthalene, chloromethylstyrene, hydroxymethylstyrene, α-methylstyrene, divinylbenzene or so; amide type monomer such as acrylamide, N-methlolacrylamide, acrylamide-2-methylpropanesulfate or so; α,β-unsaturated nitrile compound such as acrylonitrile, methacrylonirile or so; olefins such as ethylene, propylene or so; diene type monomer such as butadiene, isoprene or so; halogen atom containing monomer such as vinyl chloride, vinyliden chloride or so; vinyl ester groups such as vinyl acetate, vinyl propionate, vinyl lactate, vinyl benzoate or so; vinyl ethers such as methylvinylether, ethylvinylether, butylvinylether or so; vinyl ketones such as methylvinyl ketone, ethylvinyl ketone, butylvinyl ketone, hexylvinyl ketone, isopropenylvinyl ketone or so; heterocycle containing vinyl compound such as N-vinylpyrrolidone, vinylpyridine, vinylimidazol or so may be mentioned.

The used amount of these binders are preferably, in terms of solid portion equivalent amount, 0.1 to 10 parts by weight, and more preferably 0.5 to 8 parts by weight with respect to 100 parts by weight of electrode active material. When the binder is within this range, the strength and the flexibility of the obtained electrode is good.

(The Active Material)

The slurry composition for the lithium ion secondary battery negative electrode may include general negative electrode active material for the lithium ion secondary battery.

As the general negative electrode active material for the lithium ion secondary battery, for example, carbon material such as amorphous carbon, graphite, natural graphite, mesocarbon microbeads(MCMB), pitch type carbon fiber or so, and highly conductive polyacene or so may be mentioned. Preferably it is graphite, natural graphite, mesocarbon microbeads, and more preferably it is graphite. By using the general negative electrode active material for the lithium ion secondary battery together, the composite particle can be attached on the active material hence the slurry stability over time can be improved. Also, since the conductivity can be improved by using the graphite together, the output characteristic of the cell can be improved as well. These general negative electrode active materials for the lithium ion secondary battery is added within the range so that the negative electrode active material:the general negative electrode active material in weight ratio satisfy preferably 100:0 to 25:75, more preferably 75:25 to 50:50. When it is within such range, the high capacity and charge-discharge cycle can be satisfied at the same time.

(The Conductive Material)

The slurry composition for the lithium ion secondary battery negative electrode may comprise the conductive material. As the conductive material, the conductive carbon such as acetylene black, Ketjen black, carbon black, vapor phase growth carbon fiber, and carbon nanotube or so may be used. By using the conductive material, the electrical contact between the electrode active materials can be improved, and the discharge rate characteristic in case of using the lithium ion secondary battery can be improved. The used amount of the conductive material is usually 0 to 20 parts by weight, preferably 1 to 10 parts by weight, with respect to 100 parts by weight of entire negative electrode active material. The entire negative electrode material refers to the total of the negative electrode active material of the present invention and the general negative electrode active material for the lithium ion secondary battery.

(The Viscosity Thickener)

The slurry composition for the lithium ion secondary battery negative electrode of the present invention may comprise the viscosity thickener. As for the viscosity thickener, the cellulose type polymer such as carboxymethyl cellulose, methyl cellulose, hydroxypropylcellulose or so and the ammonium salt or the alkali metal salt thereof; (modified) poly(meth)acrylic acid and the ammonium salt or the alkali metal salt thereof; polyvinylalcohol such as (modified) poly vinylalcohol, copolymer of the acrylic acid or the acrylic acid salt and the vinylalcohol copolymer of vinyl alcohol and fumaric acid or maleic unhydride or maleic acid or so; polyethyleneglycol, polyethyleneoxide, polyvinylpyrrolidone, modified polyacrylic acid, oxidized starch, starch phosphate, casein, and various modified starch or so may be mentioned. The blending amount of the viscosity thickener is preferably 0.5 to 1.5 parts by weight with respect to 100 parts by weight of negative electrode active material. When the blending amount of the viscosity thickener is within this range, the coating property and the adhesiveness to the current collector can be improved. In the present invention, "(modified) poly" refers to "non-modified poly" and "modified poly", and "(meth)acrylic)" refers to "acrylic" and "methacrylic".

(The Dispersion)

The dispersion medium used in the slurry for the lithium ion secondary battery used in the present invention may either use the water or the organic solvent.

As the organic solvent, acetone, tetrahydrofuran, methylenechloride, chloroform, dimethylformamide, N-methylpyrrolidone, cyclohexane, xylene, cyclohexanone or so may be mentioned. These solvent may be used alone or by combining two or more thereof, and it can be selected suitably according to the drying speed and the environmental point of view.

(The Production of the Slurry Composition for the Lithium Ion Secondary Battery Negative Electrode)

The slurry composition for the lithium ion secondary battery negative electrode is not particularly limited; however the method using the blending apparatus using stirring method, shaking method, rotating method or so may be mentioned. Also, the method using the dispersing kneading apparatus such as homogenizer, ball mill, sand mill, roll mill and planetary mixer or so may be mentioned. The solid portion concentration of the slurry composition for the negative electrode is 30 wt % or more and 80 wt % or less, and it is preferably 40 wt % or more and 60 wt % or less from the point of view of the slurry stability and the coating property.

(The Electrode for the Lithium Ion Secondary Battery)

The negative electrode for the lithium ion secondary battery of the present invention is formed by coating the slurry composition for the lithium ion secondary battery negative electrode to the current collector then drying.

(The Current Collector)

The current collector used in the present invention is not particularly limited as long as it has electric conductivity and the electrochemical resistance; however the metal material having heat resistance is preferable such as iron, copper, aluminum, nickel, stainless steel, titanium, tantalum, gold, platinum or so may be mentioned. As for the lithium ion secondary battery negative electrode, copper is particularly preferable. The shape of the current collector is not particularly limited; however it is preferably a sheet shape having the thickness of 0.001 to 0.5 mm or so. The current collector is preferably used by carrying out the roughening treatment in advance in order to enhance the adhesive strength. As for the method of the roughening treatment, the mechanical abrasive method, electrolytic abrasive method, chemical abrasive method or so may be mentioned. In the mechanical abrasive method, the coated abrasive adhered with the abrasive particle, the grind stone, emery wheel, the wire brushes with the steel wire or so may be used. Also, in order to enhance the adhesive strength of the composite and the conductivity, the intermediate layer may be formed on the surface of the current collector.

(The Production Method of the Negative Electrode)

The production method of the lithium ion secondary battery negative electrode of the present invention is not particularly limited; however for example, the method of coating said negative electrode slurry composition at least on one face of the current collector, preferably on both faces, then heat dry the electrode active material may be used. The method of coating the electrode slurry composition to the current collector is not particularly limited. For instance, a doctor blade method, a dip method, a reverse roll method, a direct roll method, a graveur method, a extrusion method, and a brushing method or so may be mentioned. As for the drying method, drying by warm air, hot air, low humidified air, vacuum drying, and irradiation of (far) infrared radiation or electron beam or so may be mentioned. The drying time is usually 5 to 30 minutes, and the drying temperature is usually 40 to 180° C.

Next, the void ratio of the negative electrode active material is preferably made low by pressure applying treatment using the mold press or the roll press. The void ratio is preferably within the range of 5% to 15%, more preferably 7% to 13%. If the void ratio is too high the charging efficiency or the discharging efficiency deteriorates. If the void ratio is too low, the problems such that the negative electrode active material layer being easily released from the current collector which tends to cause the malfunction may occur. Further, when using the curable binder, it is preferably cured.

The thickness of the electrode active material layer of the lithium ion secondary battery negative electrode (the negative electrode active material layer) is usually 5 μm or more and 300 μm or less, and preferably 30 μm or more and 250 μm or less.

The lithium ion secondary battery of the present invention comprises the positive electrode, the negative electrode, and the electrolytic solution, wherein said negative electrode is said negative electrode for the lithium ion secondary battery.

(The Positive Electrode)

The positive electrode of the present invention comprises at least the positive electrode active material binded on the current collector, the conductive agent, and the electrode active material layer including the binder (the positive electrode active material layer).

As the positive electrode active material, it is not particularly limited; however lithium containing composite metal oxides such as $LiCoO_2$, $LiNiO_2$, $LiMnO_2$, $LiMn_2O_4$, $LiFePO_4$, $LiFeVO_4$ or so; transition metal sulfides such as $TiS_2$, $TiS_3$, amorphous $MoS_3$ or so; transition metal oxides such as $Cu_2V_2O_3$, amorphous $V_2O$—$P_2O_5$, $MoO_3$, $V_2O_5$, $V_6O_{13}$ or so may be mentioned. Further, the conductive polymer such as polyacetylene, poly-p-phenylene or so may be mentioned. The iron type oxides which are poor in electric conductivity may be used as the active material covered by the carbon material by placing the carbon source material during the reduction firing. Also, these compounds may be partially element substituted.

As for the binder, those exemplified in the slurry composition for the negative electrode of the present invention may be used as well. The amount of the binder in the electrode active material layer is preferably 0.1 to 5 parts by weight, more preferably 0.2 to 4 parts by weight, and particularly preferably 0.5 to 3 parts by weight with respect to 100 parts by weight of the positive electrode active material. When the amount of the binder is within said range, the active material can be prevented from falling off from the electrode without interfering the battery reaction.

As the conductive material, the conductive carbon such as acetylene black, Ketjen black, carbon black, vapor phase growth carbon fiber, and carbon nanotube or so may be used. The carbon powder such as graphite, the fiber or foil of various metals or so may be mentioned. As the reinforcing material, the filler having a spherical shape, plate shape, rod shape, or fibrous shape of various inorganic or organic may be used. By using the conducting agent, the electrical contact between the electrode active materials can be improved, and the discharge rate characteristic in case of using the lithium ion secondary battery can be improved. The used amount of the conducting agent is usually 0 to 20 parts by weight, and preferably 1 to 10 parts by weight with respect to 100 parts by weight of the positive electrode active material.

(The Electrolytic Solution)

The electrolytic solution used in the present invention is not particularly limited, for example, those dissolving the lithium ion salt as the supporting electrolytes in the non-aqueous solvent may be used. As the lithium salt, for example $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$ or so may be mentioned. Particularly, $LiPF_6$, $LiClO_4$, $CF_3SO_3Li$ which easily dissolves in the solvent and has high dissociation degree are preferably used. The amount of the supporting electrolytes is usually 1 wt % or more, preferably 5 wt % or more, and usually 30 wt % or less, preferably 20 wt % or less with respect to the electrolytic solution. If the amount of the supporting electrolytes is too little or too much, the ionic conductivity decreases and the charge characteristic and the discharge characteristic of the battery declines.

As the solvent used in the electrolytic solution, it is not particularly limited as long as the supporting electrolytes can be dissolved; however usually, alkyl carbonates such as dimethyl carbonate (DMC), ethylene carbonate (EC), diethyl carbonate (DEC), propylene carbonate (PC), butylene carbonate (BC) and methylethyl carbonate (MEC) or so; esters such as γ-butyrolactone, methyl formate; ethers such as 1,2-dimethoxyethane, and tetrahydrofurane or so; sulfur containing compounds such as dimethylsulfoxide or so; may be used. Dimethyl carbonate, ethylene carbonate, propylene carbonate, diethyl carbonate, methylethyl carbonate or so are preferable since it is easy to obtain the high ion conductivity, and has wide range of use temperature. These may be used alone or by combining two or more thereof.

Also, the electrolytic solution may be added with the additives. As for the additives, the compound of carbonate type such as vinylene carbonate (VC) or so is preferable.

As for the electrolytes besides the above described, gel polymer electrolytes in which the polymer electrolytes such as polyethylene oxide and polyacrylonitrile or so are immersed in the electrolytic solution, or the inorganic solid electrolytes such as LiI, $Li_3N$ or so may be mentioned.

(The Production Method of the Lithium Ion Secondary Battery)

As the production method of the lithium ion secondary battery of the present invention, it is not particularly limited. For example, the negative electrode is stacked via the separator; and rolled up or bound according to the shape of the battery to place in the battery container, then the battery container is closed after introducing the electrolytic solution. Further, depending on the needs, an expand metal, an electric fuse, an over current protection element such as PTC element or so, a lead board or so may be introduced to prevent the pressure from rising up in the battery, and over charge-discharge. The shape of the battery may be any of the coin shape, the button shape, the sheet shape, the cylinder shape, the square shape, and the flat shape.

(The Separator)

As the separator, the known types such as the non-woven fabric or microporous membrane such as made of polyolefin such as polyethylene, polypropylene or so, or aromatic polyamide resin; porous resin coat including the inorganic ceramic powder may be used.

EXAMPLES

Hereinafter the present invention will be described based on the examples, however; it is not to be limited thereto. Note that, parts and % in the present examples are based on the weight unless mentioned otherwise.

In the examples and the comparative examples, various properties are evaluated as follows.

<The Glass Transition Temperature>

The aqueous dispersion of the polymer particle was casted on the substrate made of tetrafluoroethylene, and was dried at room temperature of 25° C. for 48 hours to mold into a sheet shape having the thickness of 1 mm. The molded polymer film was measured using the differential scanning calorimetry (DSC measurement) at the temperature rising speed of 5° C./min, and the obtained glass transition temperature was set as the glass transition temperature.

<The Elasticity>

The dispersion of the polymer particle was casted on the substrate made of tetrafluoroethylene, and was dried at room temperature of 25° C. for 48 hours to mold into a sheet shape having the thickness of 1 mm. The molded polymer film was punched using the No. 3 dumbbell of JIS K6301, and this was set as the test piece. Then, this test piece was stretched in the longitudinal direction at 10 mm/min under room temperature of 25° C., then the stretch elasticity was determined from the ratio between the initial tension and the strain; thereby the elasticity was determined.

<The Particle Production Time>

The entire time for producing 1 kg of the negative electrode active material for the lithium ion secondary battery was evaluated. As this value is small, it indicates that the production can be made in short time.

A: less than 24 hours
B: 24 hours or more and less than 36 hours
C: 36 hours or more <The Particle Dispersibility>

The negative electrode slurry composition was obtained as described in the following using the gauge (the particle gauge) in reference to JIS K5600-2-5:1999. Among the start point of the lines observed on the gauge, the third largest particle degree was measured. The measurements were carried out for 6 times, and the largest value measured was determined as the particle degree. The smaller the particle degree is, the better the dispersibility is.

A: less than 40 μm
B: 40 μm or more and less than 60 μm
C: 60 μm or more

<The Charge-Discharge Cycle Retention Rate>

Using the produced coin shaped battery, the charge-discharge cycle was carried out in which it was charged up to 1.5V by the constant current of 0.1 C at 20° C., then discharged until 0.2V at constant current of 0.1 C. The charge-discharge cycle was carried out for 50 cycles, and the capacity retention rate which is the ratio of the initial discharge capacity against the discharge capacity after $50^{th}$ cycles, and evaluated as follows. As this value is large, it indicates that the decrease in the capacity due to the repeating charge-discharge is small.

A: 75% or more
B: 60% or more and less than 75%
C: 50% or more and less than 60%
D: 40% or more and less than 50%
E: less than 40%

Example 1

<The Polymer Particle Production>

300 parts of ion exchange water, 33 parts of styrene, 65 parts of 2-ethylhexylacrylate, 2.0 parts of dimethylaminoehtylmethacrylate, and 0.05 parts of t-dodecylmercaptan as the molecular weight modifier, 0.3 parts of potassium persulfate as the polymerization initiator, were introduced into the autoclave with the stirrer, and stirred sufficiently, then it was polymerized by heating to 70° C. After the polymerization, the neutralization treatment was carried out by using acetic acid at 40° C., the dispersion including the polymer particle (hereinafter it may be referred as "polymer particle 1") was obtained. The polymerization conversion rate determined from the solid portion concentration was approximately 99%. The volume average particle diameter of the obtained polymer particle 1 is 0.1 μm, the cationic group is nitrogen cation, and the containing ratio of the cationic group in the polymer particle 1 is 2% in terms of the containing ratio of the monomer having the cationic group, and the glass transition temperature was −20° C., the elasticity at 25° C. was 20 MPa.

<The Production of the Composite Particle>

1 parts of the obtained polymer particle 1 was immersed in the catalyst solution constituted from palladium chloride 0.01 parts, aqua regia 5 parts, extra pure water 10 parts for 24 hours at 5° C., and palladium was absorbed as the catalyst. Then, it was immersed in the electroless plating solution constituted from 15 parts of $Ni(PH_2O_2)_2/6H_2O$, 12 parts of $H_3BO_3$, 2.5 parts of $CH_3COONa$, 1.3 parts of $(NH_3)_2SO_4$ for 5 minutes at 30° C., thereby obtained the electroless plating particle. Next, this electroless plating particle was carried out with the electrolytic plating in the electrolytic plating solution constituted from 105 parts of $K_2SnO_3/3H_2O$, 200 parts of $Na_2Sn(OH)_6$, 15 parts of KOH, 7 parts of $CH_3COOK$, thereby obtained the composite particle 1. For the electrode of the electrolytic plating, Ni mesh and Sn board was used. The electrolytic plating was carried out for 1 hour, and the thickness of the metal layer of the electroless plating layer a1 was about 2 nm, the electrolytic plating layer a2 was about 10 nm. The time spend to produce the composite particle is shown in Table 1.

(The Production of the Slurry Composition for Negative Electrode)

Carboxymethyl cellulose ("cellogen BSH-12," made by DAI-ICHI KOUGYO SEIYAKU CO., LTD) having the solution viscosity of 8000mPa·s as the carboxymethyl cellulose was used and 1.5% solution was prepared.

150 parts of above composite particle as the active material, 50 parts of artificial graphite having average particle diameter of 24.5 μm were introduced in the planetary mixer with the disperser, then 66.7 parts of above described 1.5% solution was added, then the solid portion concentration was controlled to be 53.5% using the ion exchange water, then mixed for 60 minutes at 25° C. Next, the solid portion concentration was controlled to be 44% using the ion exchange water, then further mixed for 15 minutes at 25° C. Next, into this solution, 3 parts of styrene-acrylonitrile copolymer (the glass transition temperature −10° C.) was added and further mixed for 10 minutes. Thereby, the negative electrode slurry composition having a good fluidity and shiny was obtained by performing the defoaming treatment under reduced pressure. The evaluation result of particle dispersibility of the negative electrode slurry composition is shown in Table 1.

(The Production of the Battery)

By using the comma coater, the above described slurry composition for the negative electrode was coated on the one side of the copper foil having the thickness of 18 μm so that the thickness after drying becomes 100 μm or so, then it was dried for 20 minutes at 60° C., followed by heat treating for 2 hours at 150° C. thereby the negative electrode active material layer was formed. Next, the roll press was used to obtain the negative electrode plate having the thickness of 50 μm by press stretching. When the thickness of the obtained negative electrode layer was measured, the thickness was even.

Said negative electrode plate was cut into a disk having the diameter of 15 mm which was used as the negative electrode, and the separator formed from propylene porous membrane of the disk shape having the diameter 18 mm and the thickness of 25 μm was stacked on the negative electrode active material layer face side of said negative electrode, and the lithium metal used as the opposite electrode was stacked, then it was placed in the coin shape outer container (the diameter of 20 mm, the height of 1.8 mm, the thickness of the stainless steel 0.25 mm) made of stainless steel provided with the propylene packing. In to this container, the electrolytic solution was introduced so that no air is left in, and the stainless steel having the thickness of 0.2 mm was covered on the outer container via the propylene packing and fixed, thereby the battery can was sealed and produced the coin shape lithium ion battery having the diameter of 20 mm and thickness of 2 mm.

Note that, as for the electrolytic solution, the solution dissolving the $LiPF_6$ at the concentration of 1 mol/liter to the mixed solvent obtained by mixing ethylene carbonate (EC) and diethyl carbonate (DEC) at EC:DEC=1:2 (the volume ratio at 20° C.) was used. The ability of this battery is shown in Table 1.

Example 2

300 parts of ion exchange water, 76 parts of 2-ethylhexylacrylate, 20 parts of acrylonitrile, 2.0 parts of itaconic acid, 0.05 parts of t-dodecylmercaptan as the molecular weight modifier, 0.3 parts of potassium persulfate as the polymerization initiator, were introduced into the autoclave with the stirrer, and stirred sufficiently, then it was polymerized by heating to 70° C., and obtained the dispersion including the polymer particle (hereinafter it may be referred as "polymer particle 2"). The polymerization conversion rate determined from the solid portion concentration was approximately 99%. The volume average particle diameter of the obtained polymer particle 2 is 0.1 μm, the anionic group is carboxylic group, and the containing ratio of the anionic group in the polymer particle 2 is 2% in terms of the containing ratio of the monomer (itaconic acid) having the anionic group, and the glass transition temperature was −15° C., the elasticity at 25° C. was 400 MPa.

1 parts of the obtained polymer particle 2 was immersed in the catalyst solution constituted from 0.01 parts of palladium chloride, 5 parts of aqua regia, 10 parts of extra pure water for 24 hours at 5° C., and palladium was absorbed as the catalyst. Then, it was immersed in the electroless plating solution constituted from 15 parts of $Cu(PH_2O_2)_2/6H_2O$, 12 parts of $H_3BO_3$, 2.5 parts of $CH_3COONa$, 1.3 parts of $(NH_3)_2SO_4$ for 5 minutes at 30° C., thereby obtained the electroless plating particle was obtained. Next, this electroless plating particle was carried out with the electrolytic plating in the electrolytic plating solution constituted from 105 parts of $K_2SnO_3/3H_2O$, 200 parts of $Na_2Sn(OH)_6$, 15 parts of KOH, 7 parts of $CH_3COOK$, thereby obtained the composite particle 2. For the electrode of the electrolytic plating, Ni mesh and Sn board was used. The electrode plating was carried out for 1 hour, and the thickness of the metal layer of the electroless plating layer a1 was about 8 nm, the electrolytic plating layer a2 was about 10 nm. The time spend to produce the composite particle is shown in Table 1.

Except for using the above composite particle 2 instead of composite particle 1, the slurry composition for negative electrode, the negative electrode and the lithium ion secondary battery were produced as same as the example 1, and evaluated. The results are shown in Table 1.

Example 3

300 parts of ion exchange water, 55 parts of 2-ethylhexylacrylate, 45 parts of acrylonitrile, 0.05 parts of t-dodecylmercaptan as the molecular weight modifier, 0.3 parts of potassium persulfate as the polymerization initiator, were introduced into the autoclave with the stirrer, and stirred sufficiently, then it was polymerized by heating to 70° C., and obtained the dispersion including the polymer particle (hereinafter it may be referred as "polymer particle 3"). The polymerization conversion rate determined from the solid portion concentration was approximately 99%. The volume average particle diameter of the obtained polymer particle 3 was 0.1 μm, and the glass transition temperature was 0° C., the elasticity at 25° C. was 1000 MPa.

Except for using the polymer particle 3 instead of the polymer particle 1, the same procedure as the example 1 was carried out and the composite particle 3 was obtained. The thickness of the metal layer of the obtained composite particle was 8 nm for the electroless plating layer a1, and 10 nm for the electrolytic plating layer a2. The results are shown in Table 1.

Except for using the above composite particle 3 instead of the composite particle 1, the slurry composition for the negative electrode, the negative electrode and the lithium ion secondary battery were produced as same as the example 1, and evaluated. The results are shown in Table 1. Although, there were no practical problems, the particle dispersibility or the charge-discharge cycle were not as good as the example 1 and the example 2. This is thought to be caused by the failure to prevent the volume expansion due to the high elasticity of the polymer particle.

Example 4

1 parts of the commercially available polystyrene beads (0.1 μm of the volume average particle diameter, hereinafter it may be referred as "polymer particle 4") was immersed in the catalyst solution constituted from 0.01 parts of palladium chloride, 5 parts of aqua regia, 10 parts of extra pure water for 24 hours at 5° C., and palladium was absorbed as the catalyst. Then, it was immersed in the electroless plating solution constituted from 15 parts of $Sn(PH_2O_2)_2/6H_2O$, 12 parts of $H_3BO_3$, 2.5 parts of $CH_3COONa$, 1.3 parts of $(NH_3)_2SO_4$ for 5 minutes at 30° C., thereby obtained the composite particle 4. The thickness of the metal layer of the obtained composite particle was about 1 nm for the electroless plating layer a1. The results are shown in Table 1. The glass transition temperature of the polymer particle 4 was 75° C., and the elasticity at 25° C. was 2700 MPa.

Except for using the above composite particle 4 instead of the composite particle 1, the slurry composition for the negative electrode, the negative electrode and the lithium ion secondary battery were produced as same as the example 1, and evaluated. The results are shown in Table 1. Although, there were no practical problems, the particle dispersibility or the charge-discharge cycle were not as good as the example 1 and the example 2. This is thought to be caused by the failure to prevent the volume expansion due to the high elasticity of the polymer particle.

Example 5

300 parts for ion exchange water, 50 parts of butadiene, 47 parts of styrene, 3 parts of methacrylic acid, 0.05 parts t-dodecylmercaptan as the molecular weight modifier, 0.3 parts potassium persulfate as the polymerization initiator, were introduced into the autoclave with the stirrer, and stirred sufficiently, then it was polymerized by heating to 70° C., and obtained the dispersion including the polymer particle (hereinafter it may be referred as "polymer particle 5"). The polymerization conversion rate determined from the solid portion concentration was approximately 99%. The volume average particle diameter of the obtained polymer particle 25 is 0.1 μm, the anionic group is carboxyl group, and the containing ratio of the anionic group in the polymer particle 5 is 3% in terms of the containing ratio of the monomer (methacrylic acid) having the cationic group, and the glass transition temperature was −10° C., the elasticity at 25° C. was 5 MPa.

Except for using the polymer particle 5 instead of the polymer particle 1, the same procedure as the example 1 was carried out and the composite particle 5 was obtained. The thickness of the metal layer of the obtained composite particle was 8 nm for the a1 layer, and 10 nm for the a2 layer. The results are shown in Table 1.

Except for using the above composite particle 5 instead of the composite particle 1, the negative electrode slurry composition, the negative electrode and the lithium ion secondary battery were produced as same as the example 1, and evaluated. The results are shown in Table 1. Although, there were no practical problems, the particle dispersibility or the charge-discharge cycle were not as good as the example 1 and the example 2. This is thought to be caused by the failure to prevent the volume expansion due to the high elasticity of the polymer particle.

Comparative Example 1

50 parts of tin powder, 50 parts of the polymer particle 1 obtained by example 1, and 200 parts of N-methylpyrrolidone were used to obtain the slurry. The composite particle was produced by spray coating said slurry using the flowing type granulation apparatus. Then the composite particle was heat treated for 24 hours at 500° C. to remove the core portion and obtained the hollow particle.

Except for using the hollow particle instead of the composite particle 1, the negative electrode slurry composition, the negative electrode and the lithium ion secondary battery were produced as same as the example 1, and evaluated. The results are shown in Table 1.

The obtained hollow particle had bad dispersibility in the slurry composition. This is thought to be caused since the particle or the electric charge was not even compared with the metal layer formed by the electrical plating. Also, the charge-discharge characteristic is deteriorated, and this is thought to be caused by the bad influence to the cycle due to the remaining fluid in the hollow particle, further the fall off of the particle from the current collector due to the dispersing insufficiency.

troless plating and a metal layer a2 formed by an electrolytic plating in this order from the core side.

3. The negative electrode active material for the lithium ion secondary battery as set forth in claim 1 or claim 2, wherein a glass transition temperature of said polymer is −70° C. or more and 80° C. or less.

4. The negative electrode active material for the lithium ion secondary battery as set forth in claim 1, wherein an elasticity at 25° C. of said polymer is 10 MPa or more and 1000 MPa or less.

5. A slurry composition for a lithium ion secondary battery negative electrode comprising the negative electrode active material for a lithium ion secondary battery as set forth in claim 1, a binder and a dispersing medium.

6. The slurry composition for the lithium ion secondary battery negative electrode as set forth in claim 5 further comprising graphite.

7. A lithium ion secondary battery negative electrode formed by coating the slurry composition for the lithium ion secondary battery negative electrode as set forth in claim 5 or 6 to a current collector, then drying.

8. A lithium ion secondary battery comprising a positive electrode, an negative electrode, and an electrolytic solution, wherein said negative electrode is the lithium ion secondary battery negative electrode as set forth in claim 7.

9. The negative electrode active material for a lithium ion secondary battery as set forth in claim 1, wherein, when the

TABLE 1

| | | Example 1 | Example 2 | Example 3 | Example 4 | Example 5 | Comparative Example 1 |
|---|---|---|---|---|---|---|---|
| Polymer | Polymer particle | Aqueous acrylate polymer dispersion particle | | | Polyethylene beads | Aqueous diene polymer dispersion particle | Aqueous acrylate polymer dispersion particle |
| | Glass transition temp. (° C.) | −20 | −15 | 0 | 75 | −10 | — |
| | Elasticity (MPa) | 20 | 400 | 1000 | 2700 | 5 | — |
| | Functional group | cationic containing | anionic containing | — | — | anionic containing | — |
| Metal layer | Production method of the metal layer | Plating | Plating | Plating | Plating | Plating | Spary coating |
| | Type of electroless plating | Ni plating | Cu plating | Ni plating | Sn plating | Ni plating | — |
| | Type of electrolytic plating | Sn alloy plating | Sn alloy plating | Sn alloy plating | — | Sn alloy plating | — |
| | Time for the production of the particles | A | A | A | A | A | C |
| | Particle dispercibility | A | A | B | B | B | C |
| | Charge-discharge retention rate | A | A | C | C | B | E |

The invention claimed is:

1. A negative electrode active material for a lithium ion secondary battery comprising a composite particle having a core/shell structure comprised from a core portion formed by polymer and a shell portion of a metal layer, wherein said polymer is selected from the group consisting of a diene type polymer, an acrylic type polymer, a fluoride type polymer, a urethane type polymer and a silicone type polymer, said polymer comprising a cationic group or an anionic group, and said metal layer of shell portion is formed by metal plating.

2. The negative electrode active material for the lithium ion secondary battery as set forth in claim 1, wherein said metal layer comprises at least a metal layer a1 formed by an elecpolymer comprises a cationic group, said cationic group is represented by $R_1R_2R_3R_4N^+(A^-)$, and $R_1$ is —$CH_2$—CHOH—$CH_2$— or —$CH_2$—$CH_2$—, $R_2$, $R_3$, $R_4$ are independently selected from alkyl group or arylalkyl group comprising 1 to 20 carbon atoms, and A is any one of halide ion, sulfate ion, phosphate ion or tetrafluoro borate ion.

10. A negative electrode active material for a lithium ion secondary battery comprising a composite particle having a core/shell structure comprised from a core portion formed by polymer and a shell portion of a metal layer, wherein said polymer comprises a cationic group or an anionic group, and said metal layer of shell portion is formed by metal plating, and a content of said anionic group or cationic group in said polymer constituting a composite particle is 1 to 10 wt % in terms of a content of an anionic group containing unit monomer or a cationic group containing unit monomer.

11. The negative electrode active material for a lithium ion secondary battery as set forth in claim 1, wherein the metal layer comprises tin.

* * * * *